(12) United States Patent
Takeda et al.

(10) Patent No.: US 12,045,315 B2
(45) Date of Patent: Jul. 23, 2024

(54) NEURAL NETWORK-BASED IMAGE-TO-IMAGE TRANSLATION

(71) Applicant: SONY GROUP CORPORATION, Tokyo (JP)

(72) Inventors: Hiroyuki Takeda, San Jose, CA (US); Mohammad Gharavi-Alkhansari, San Jose, CA (US)

(73) Assignee: SONY GROUP CORPORATION, Tokyo (JP)

(*) Notice: Subject to any disclaimer, the term of this patent is extended or adjusted under 35 U.S.C. 154(b) by 602 days.

(21) Appl. No.: 17/184,099

(22) Filed: Feb. 24, 2021

(65) Prior Publication Data
US 2022/0269906 A1    Aug. 25, 2022

(51) Int. Cl.
*G06F 18/214* (2023.01)
*G06F 18/213* (2023.01)
*G06N 3/08* (2023.01)
*G06T 3/4046* (2024.01)

(52) U.S. Cl.
CPC ........ *G06F 18/2148* (2023.01); *G06F 18/213* (2023.01); *G06N 3/08* (2013.01); *G06T 3/4046* (2013.01)

(58) Field of Classification Search
CPC ..... G06F 18/2148; G06F 18/213; G06N 3/08; G06T 3/4046
See application file for complete search history.

(56) References Cited

U.S. PATENT DOCUMENTS

| 2018/0075581 | A1* | 3/2018 | Shi | G06N 3/045 |
| 2018/0240257 | A1* | 8/2018 | Li | G06V 10/774 |
| 2018/0307947 | A1* | 10/2018 | Choi | G06F 18/22 |
| 2019/0295302 | A1 | 9/2019 | Fu | |

OTHER PUBLICATIONS

Goodfellow, et al., "Generative Adversarial Nets", Advances in Neural Information Processing Systems 27 NIPS, 2014, pp. 2672-2680.

(Continued)

*Primary Examiner* — Qun Shen
(74) *Attorney, Agent, or Firm* — CHIP LAW GROUP

(57) ABSTRACT

A system and method for neural-network based image-to-image translation is provided. The system includes a generator network which receives an image and generates a first synthetic image based on the received image. The first synthetic image is different from the image in appearance, style, or domain. The system includes a feature-to-image generator that extracts a feature map from an intermediate layer of the generator network and generates a second synthetic image. The system further includes a first discriminator network that generates a result indicative of whether the first synthetic image is real or fake in comparison to a first reference image and a second discriminator network that generates a result indicative of whether the second synthetic image is real or fake in comparison to a second reference image. The system further includes a processor which trains the first generator network in adversarial manner based on losses associated with the results.

13 Claims, 5 Drawing Sheets

(56) References Cited

OTHER PUBLICATIONS

Yi, et al., "DualGAN: Unsupervised Dual Learning for Image-to-Image Translation", Computer Vision and Pattern Recognition, arXiv, 2018, 17 pages.

Zhu, et al., "Unpaired Image-to-Image Translation using Cycle-Consistent Adversarial Networks", Computer Vision and Pattern Recognition, arXiv, Aug. 2020, 18 pages.

Kim, et al., "Learning to Discover Cross-Domain Relations with Generative Adversarial Networks", Computer Vision and Pattern Recognition, arXiv, May 2017, 10 pages.

Choi, et al., "StarGAN: Unified Generative Adversarial Networks for Multi-domain Image-to-Image Translation", IEEE/CVF Conference on Computer Vision and Pattern Recognition, Jun. 18-23, 2018, pp. 8789-8797.

Karras, et al., "Progressive Growing of GANs for Improved Quality, Stability, and Variation", Neural and Evolutionary Computing, ICLR 2018, 26 pages.

Ronneberger, et al., "U-Net: Convolutional Networks for Biomedical Image Segmentation", International Conference on Medical Image Computing and Computer-Assisted Intervention, LNCS, vol. 9351, 2015, pp. 234-241.

Yang, et al., "Stacked Hourglass Network for Robust Facial Landmark Localisation", IEEE Conference on Computer Vision and Pattern Recognition Workshops (CVPRW), Jul. 21-26, 2017, pp. 2025-2033.

Gatys, et al., "Image Style Transfer Using Convolutional Neural Networks", 2016 IEEE Conference on Computer Vision and Pattern Recognition (CVPR), Jun. 2016, pp. 2414-2423.

Behnam Neyshabur et al: "Stabilizing GAN Training with Multiple Random Projections", arxiv.org, Cornell University Library, 201 Olin Library Cornell University Ithaca, NY 14853, May 22, 2017, XP081324558, p. 1-p. 2; figure 1.

* cited by examiner

NEURAL NETWORK-BASED IMAGE-TO-IMAGE TRANSLATION

CROSS-REFERENCE TO RELATED APPLICATIONS/INCORPORATION BY REFERENCE

None.

FIELD

Various embodiments of the disclosure relate to neural networks. More specifically, various embodiments of the disclosure relate to a system and method for a neural network-based image-to-image translation.

BACKGROUND

Advancements in machine learning and artificial intelligence have led to development of various kinds of artificial neural networks, which may be used in applications, such as image synthesis or image-to-image translation. A generative adversarial network (GAN) is a neural network-based generative model that learns from a training dataset and generates new data with same characteristics as that of training data in the training dataset. GAN includes two neural networks, i.e. a generator and a discriminator. While training, both the generator and discriminator compete against each other in a zero-sum game. While the generator may produce synthetic data, the discriminator may distinguish the synthetic data produced by the generator from real world examples. A problem with GAN is its poor convergence property during the training process.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for a neural network-based image-to-image translation is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for neural network-based image-to-image translation. The system includes a first generator network that may receive a first image as an input and may generate a first synthetic image based on the received first image. The first synthetic image may be different from the first image in one of appearance, style, or domain. The system further includes a first feature-to-image generator configured to extract a first feature map from a first intermediate layer of the first generator network and generate a second synthetic image based on the extracted first feature map. The system further includes a first plurality of discriminator networks coupled to the first generator network. The first plurality of discriminator networks includes a first discriminator network and a second discriminator network, for example. The first discriminator network generates a first result indicative of whether the first synthetic image is real or fake in comparison to a first reference image. The second discriminator network generates a second result indicative of whether the second synthetic image is real or fake in comparison to a second reference image. The system further includes a processor that is configured to train the first generator network in an adversarial manner against the first plurality of discriminator networks based on first generator losses associated with the first result and the second result.

Traditional image-to-image translation networks, such as generative adversarial networks (GANs) sometimes have a poor convergence property during training. For instance, as a generator network of a traditional GAN is trained in adversarial manner based on feedback from a discriminator of the traditional GAN, the performance of the generator network may improve. As the performance of the generator network improves, the discriminator network may find it more difficult to correctly distinguish whether the output of the generator network is real or fake. As a result, the impact of the feedback of the discriminator network on the training of the generator network may decrease over time. If the generator network is trained past the point when the discriminator network gives completely random feedback, then the generator network may start to train on the random feedback, and the quality of the generator network may collapse.

The present disclosure may avoid the poor convergence of the GAN by training the GAN in a cyclic configuration and introducing multi-scale reconstruction losses and/or multi-scale generator losses between several multi-scale images during the training. In order to generate multi-scale images on input side of the generator network, down-sampling may be used on the input image. The feature-to-image extraction may be used to generate multi-scale synthetic images.

Figure 1:
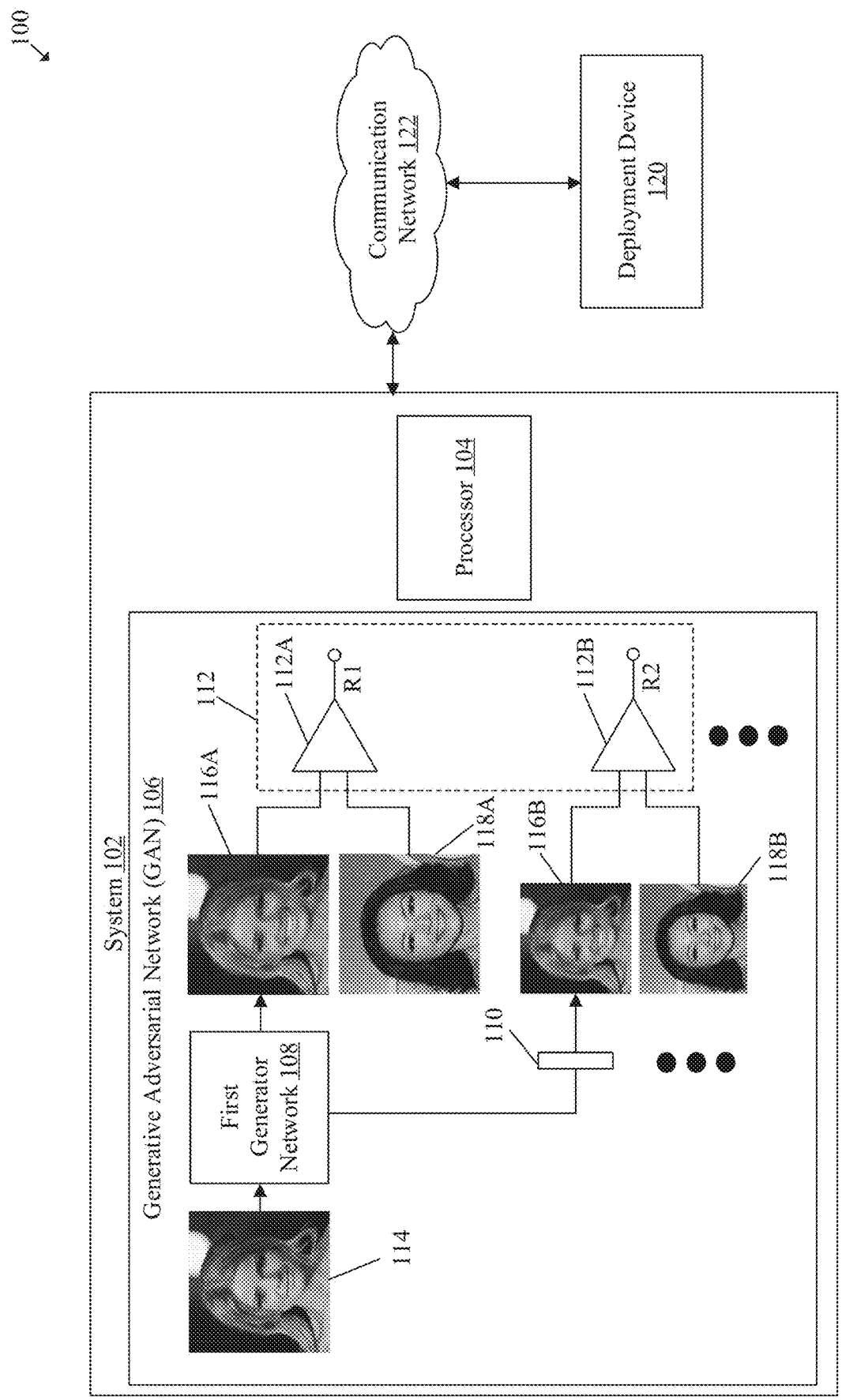
FIG. 1 is a diagram that illustrates a network environment for a neural network-based image-to-image translation, in accordance with an embodiment of the disclosure.

FIG. 1 is a diagram that illustrates a network environment for a neural network-based image-to-image translation, in accordance with an embodiment of the disclosure. With reference to FIG. 1, there is shown a diagram of a network environment 100. The network environment 100 includes a system 102. The system 102 includes a processor 104 and a generative adversarial network (GAN) 106. The GAN 106 may include a first generator network 108, a first feature-to-image generator 110, and a first plurality of discriminator networks 112. The first plurality of discriminator networks 112 may include, for example, a first discriminator network 112A and a second discriminator network 112B. With reference to FIG. 1, there is also shown a first image 114, a first synthetic image 116A, a second synthetic image 116B, a first reference image 118A, and a second reference image 118B. With reference to FIG. 1, there is further shown a deployment device 120 and a communication network 122.

The processor 104 may include suitable logic, circuitry, and interfaces that may be configured to execute program instructions associated with different operations to be executed by the system 102. For example, some of the operations may relate to a training of the GAN 106. The processor 104 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The GAN 106 may be a computational network or a system of artificial neurons, arranged in a plurality of layers, as nodes. The GAN 106 may translate an image in one domain to an image in a different domain or same domain but with a different appearance or style. For instance, the GAN 106 may be trained on a generative task, such as an image-to-image translation task. Examples of the image-to-image translation task may include, but are not limited to, an image-to-semantic mask generation task, a semantic mask-to-image generation task, a photo image-to-cartoonish image generation task (cartoonish image may refer to a type of digital illustration of object(s) or background of the photo image in a non-realistic or semi-realistic style), a cartoonish image-to-photo image generation task, a low-resolution image-to-high-resolution image generation task, a neutral face image-to-blend-shape image generation task, a grayscale image-to-color image generation task, an image inpainting task, or an image retouching task. Some example implementations of the GAN 106 may include, but are not limited to, an image-to-image GAN, a bi-directional GAN, a spatial attention GAN, a conditional GAN, a pix2pix GAN, a Deep GAN, a weakly supervised GAN, a Cycle-GAN, a StarGAN, a BicycleGAN, a multiscale GAN, a Harmonic GAN, an unsupervised image-to-image translation network (UNIT) based on Coupled GAN, and/or a combination of such networks.

The GAN 106 may include a generator network (such as the first generator network) to generate a synthetic image in one domain based on an input image in the same or different domain. A number of down-scaled versions of the input image may be also generated. The GAN 106 may also include the first plurality of discriminator networks 112 (such as the first discriminator network 112A and the second discriminator network 112B) to distinguish the generated image (and the down-scaled versions) from reference image(s) (which may be real and not synthetic). For example, if the input image includes a neutral face, then the generator network may generate a synthetic image of a smiling face.

The GAN 106 may be based on a game theoretic scenario in which the generator network must compete against an adversary, i.e. one or more discriminator networks. The generator network may directly produce synthetic images. Its adversary, the discriminator network, may attempt to distinguish between example images drawn from a training set and example images drawn from the generator network. The generator and discriminator networks may be trained together in a zero-sum game, until each discriminator network is fooled about half the time in its attempts to correctly distinguish between the example images (which may mean that the generator network is generating plausible examples). With an adversarial training process, the one or more discriminator networks may supervise the training of the generator network.

Each of the first generator network 108 and the first plurality of discriminator networks 112 may be referred to as a neural network, which may include a plurality of layers. Such layers may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from parameters of the neural network. Such parameters may be set before, while training, or after training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function.

The neural network may include electronic data, which may be implemented as, for example, a software component of an application executable on the system 102. The neural network may rely on libraries, external scripts, or other logic/instructions for execution by a processing unit, such as the processor 104. The neural network may include code and routines that may be configured to enable a computing device, such as the processor 104 to execute one or more operations associated with the image-to-image translation. Additionally, or alternatively, the neural network may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

The first generator network 108 (such as an encoder-decoder pair of neural networks) may be configured to generate synthetic images from an input image and each of the first plurality of discriminator networks 112 may classify whether the synthetic images generated by the first generator network 108 are fake or not. For example, a new example of data generated by the first generator network 108 may include a face of a person with a smiling facial expression from an input image of the same person in a neutral expression.

The first generator network 108 and at least one of the first plurality of discriminator networks 112 may be trained together in a zero-sum game, until at least the first discriminator network 112A (and the second discriminator network 112B) is fooled about half the time in its attempts to correctly distinguish between the examples (i.e. between synthetic and real images), which may mean that the first generator network 108 may be generating plausible examples. In some instances, the first discriminator network 112A may penalize the first generator network 108 for producing implausible examples. The output of the first generator network 108 may be connected directly to the input of the first discriminator network 112A. The results produced by the first discriminator network 112A may be used to measure a GAN loss and to update parameters, such as weights of the first generator network 108 based on the measured loss.

The first generator network 108 may include electronic data, which may be implemented as, for example, a software component of an application executable on the system 102 and/or the deployment device 120. The first generator network 108 may rely on libraries, external scripts, or other logic/instructions for execution by a processing device, such as the processor 104. The first generator network 108 may include code and routines configured to enable a computing device, such as processor 104 to perform one or more operations for generation of the first synthetic image 116A based on the first image 114. Additionally, or alternatively, the first generator network 108 may be implemented using hardware including a processor, a microprocessor (e.g., to perform or control performance of one or more operations), a field-programmable gate array (FPGA), or an application-specific integrated circuit (ASIC). Alternatively, in some embodiments, the first generator network 108 may be implemented using a combination of hardware and software.

Each of the first plurality of discriminator networks 112 may be a neural network (such as an encoder-decoder pair of neural networks) that may distinguish new examples (i.e. synthetic images) generated by the first generator network 108 from reference images (for example, real images). Each of the first plurality of discriminator networks 112 may be pre-trained on a training dataset to distinguish between real and fake or synthetic images of same class.

In an embodiment, the training dataset may include a plurality of pairs of training data. Each pair of training data may include a real data instance and a fake data instance. The real data instance may correspond to a real-world data (such as a real image of a human) and the fake data instance may correspond to the fake data (such as a synthetic image of the human). The real data instances may act as positive training samples, and the fake data instances may act as negative training samples for each of the plurality of first plurality of discriminator networks 112. In an embodiment, the fake data instances may be generated by the first generator network 108.

Each of the first plurality of discriminator networks 112 may include electronic data, which may be implemented as, for example, a software component of an application executable on the system 102 and/or the deployment device 120. Each of the first plurality of discriminator networks 112 may rely on libraries, external scripts, or other logic/instructions for execution by a processing device, such as the processor 104. Each of the first plurality of discriminator networks 112 may include code and routines configured to enable a computing device, such as the processor 104 to perform one or more operations for generation of a result indicative of whether a synthetic image, generated by a generator network, is real or fake in comparison to a reference image. Additionally, or alternatively, each of the first plurality of discriminator networks 112 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

Examples of the first generator network 108 and each of the first plurality of discriminator networks 112 may include, but are not limited to, a deep neural network (DNN), a convolutional neural network (CNN), a CNN-recurrent neural network (CNN-RNN), R-CNN, Fast R-CNN, Faster R-CNN, an artificial neural network (ANN), (You Only Look Once) YOLO network, a fully connected neural network, a deep Bayesian neural network, and/or a combination of such networks. In certain embodiments, the first generator network 108, and each of the first plurality of discriminator networks 112 may be based on a hybrid architecture of multiple Deep Neural Networks (DNNs).

In an embodiment, the first feature-to-image generator 110 may be coupled to the first generator network 108. The first feature-to-image generator 110 may include suitable logic, circuitry, interfaces, and/or code that may be configured to extract a feature map from an intermediate layer of the first generator network 108 and generate a new synthetic image based on the extracted feature map. The new synthetic image may be a representation of the extracted feature map and may have a resolution that may be less than that of the input image (which is provided as input to the first generator network 108) or the synthetic image (generated by the first generator network 108).

The deployment device 120 may include suitable logic, circuitry, interfaces, and/or code that may to implement the GAN 106 as part of a software program or a service (such as an Application Programming Interface (API)-based service) executable on the deployment device 120. The GAN 106 may be implemented on the deployment device 120 after the training of the GAN 106 is completed on the system 102. Examples of the deployment device 120 may include, but are not limited to, a computing device, a mainframe machine, a server, a computer workstation, a smartphone, a cellular phone, a mobile phone, a gaming device, a wearable display, a consumer electronic (CE) device, and/or any other device with image processing capabilities.

The communication network 122 may include a communication medium through which the system 102 and the deployment device 120 may communicate with each other. The communication network 122 may include one of a wired connection or a wireless connection. Examples of the communication network 122 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 122 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the first generator network 108 of the GAN 106 may receive the first image 114 as a first input. The first image 114 may be received from a data source, such as a server, a local storage that includes a dataset of images, or an external storage media. The first image 114 may be, for example, an image of animate or inanimate object(s). In an embodiment, the first image 114 may be a real image (and not a synthetic image) that may be acquired by an image capture device (such as a camera). By way of example, and not limitation, the first image 114 may be of a face of a first person (i.e. a first animate object) with a first face expression (such as a neutral face expression). The first image 114 may be of a first spatial resolution, for example, 64 by 64 pixels.

The first generator network 108 may generate a first synthetic image 116A based on the received first image 114. A synthetic image may be an image that may be artificially generated (programmatically or by computation). A real image may be generated from scenes or objects in real-world by use of an image capture device. Depending on the task, a synthetic image may or may not resemble a real image. As an example, if the first image 114 captures a face of a person in real life, then the synthetic image may be a cartoonish image of the face of the same person whose face may be captured in the first image 114. As another example, if the first image 114 captures a neutral face of a person in real life, then the synthetic image may be a smiling face image of the same person whose neutral face may be captured in the first image 114. In the previous example, the formation of the real image obeys the laws of optics. The formation of the synthetic image may only simulate the laws of optics and may be generated by pure computation.

In an embodiment, the first synthetic image 116A may be of the first spatial resolution, which may be same as that of the first image 114. The first synthetic image 116A may be different from the first image 114 in at least one of an appearance, a style, or a domain. The appearance may be determined by at least one of a state or condition, or visibly identifiable features of an object in an image. By way of example, and not limitation, the first synthetic image 116A may be different from the first image 114 in appearance. The first synthetic image 116A may be include a face of the first person (or a second person) with a second face expression (such as a smiling face expression). The style may be at least one of a shape, a size, a visual effect, or an artistic effect associated with the image. For example, a sketch image of a landscape may correspond to style different from that of an image of an oil painting of a person. Similarly, the domain may be determined by a set of attributes, where each attribute may determine a meaningful property of the image or object(s) in the image. For example, an image of a wallet may correspond to a first domain and an image of shoe may correspond to another domain different from the first domain.

As the first synthetic image 116A is generated, the first feature-to-image generator 110 may be configured to extract a first feature map from a first intermediate layer of the first generator network 108. The first intermediate layer may correspond to any layer of the first generator network 108 other than the first and last layers (i.e. input and output layers) of the first generator network 108. The first feature map may be produced by the first intermediate layer while the first generator network 108 processes the first image 114. Based on the extracted first feature map, the first feature-to-image generator 110 may generate the second synthetic image 116B.

In an embodiment, the second synthetic image 116B may appear similar to the first synthetic image 116A. For example, the second synthetic image 116B may include the face of the first person (or the second person) with the second face expression (such as a smiling face). However, the second synthetic image 116B may be of a second resolution that may be less than the first spatial resolution of the first synthetic image 116A (or the first image 114). By way of example, and not limitation, if the first spatial resolution of the first image 114 and the first synthetic image 116A is 64 by 64 pixels, then the second spatial resolution of the second synthetic image 116B may be 32 by 32 pixels.

The first synthetic image 116A along with a first reference image 118A may be provided as an input to the first discriminator network 112A. The first reference image 118A may be, for example, a real image of the face of any person with the second face expression and may have same spatial resolution as that of the first image 114 (or the first synthetic image 116A). The first discriminator network 112A may be configured to generate a first result ($R_1$) based on the first synthetic image 116A and the first reference image 118A. Specifically, the first discriminator network 112A may compare the first synthetic image 116A with the first reference image 118A to generate the first result ($R_1$). The first result ($R_1$) may include a classification result, which may be indicative of whether or not the first synthetic image 116A is real in comparison to the first reference image 118A. In an embodiment, the first result ($R_1$) may include a binary output, i.e. a zero (0) to indicate that the first synthetic image 116A is fake or a one (1) to indicate that the first synthetic image 116A is real.

Similar to the first synthetic image 116A, the second synthetic image 116B along with a second reference image 118B may be provided as an input to the second discriminator network 112B. The second reference image 118B may be, for example, a real image of the face of any person with the second expression and may have same spatial resolution as that of the second synthetic image 116B. Similar to the first generator network 108, the second discriminator network 112B may be configured to generate a second result ($R_2$) that may be indicative of whether or not the second synthetic image 116B is real in comparison to the second reference image 118B. In an embodiment, the second result ($R_2$) may include a binary output, i.e. a zero (0) to indicate that the second synthetic image 116B is fake or a one (1) to indicate that the second synthetic image 116B is real.

The processor 104 may receive the generated first result ($R_1$) and the generated second result ($R_2$) from the first discriminator network 112A and the second discriminator network 112B, respectively. The processor 104 may determine first generator losses that may be associated with the received first result ($R_1$) and the received second result ($R_2$). Each of the first generator losses may be a quantitative measure of a deviation or a difference between a reference or expected output (such as the first reference image 118A or the second reference image 118B) and synthesized output (such as the first synthetic image 116A or the second synthetic image 116B). After the determination of the first generator losses, the processor 104 may be configured to train the first generator network 108 in an adversarial manner against the first plurality of discriminator networks 112 based on the determined first generator losses. By way of example, and not limitation, the training of the first generator network 108 may include an update of a set of parameters associated with the first generator network 108. Such parameters may include, for example, neural weights, a regularization parameter, and the like.

The training may include a process by which the first generator losses may be minimized through suitable optimization methods which require several iterations of image inputs to the first generator network 108 to determine generator losses for each iteration and update the parameters in each iteration.

The number of discriminator networks in FIG. 1 is presented merely as an example and should not be construed as limiting for the disclosure. The GAN 106 may include more than two discriminator networks for generation of more than two results, without departing from the scope of the disclosure. Similarly, the number of feature-to-image generators shown in FIG. 1 is presented merely as an example and should not be construed as limiting for the disclosure. The GAN 106 may include more than one feature-to-image generators for generation of more than one synthetic images from feature maps extracted from respective intermediate layers of the first generator network 108, without departing from the scope of the disclosure.

Figure 2:
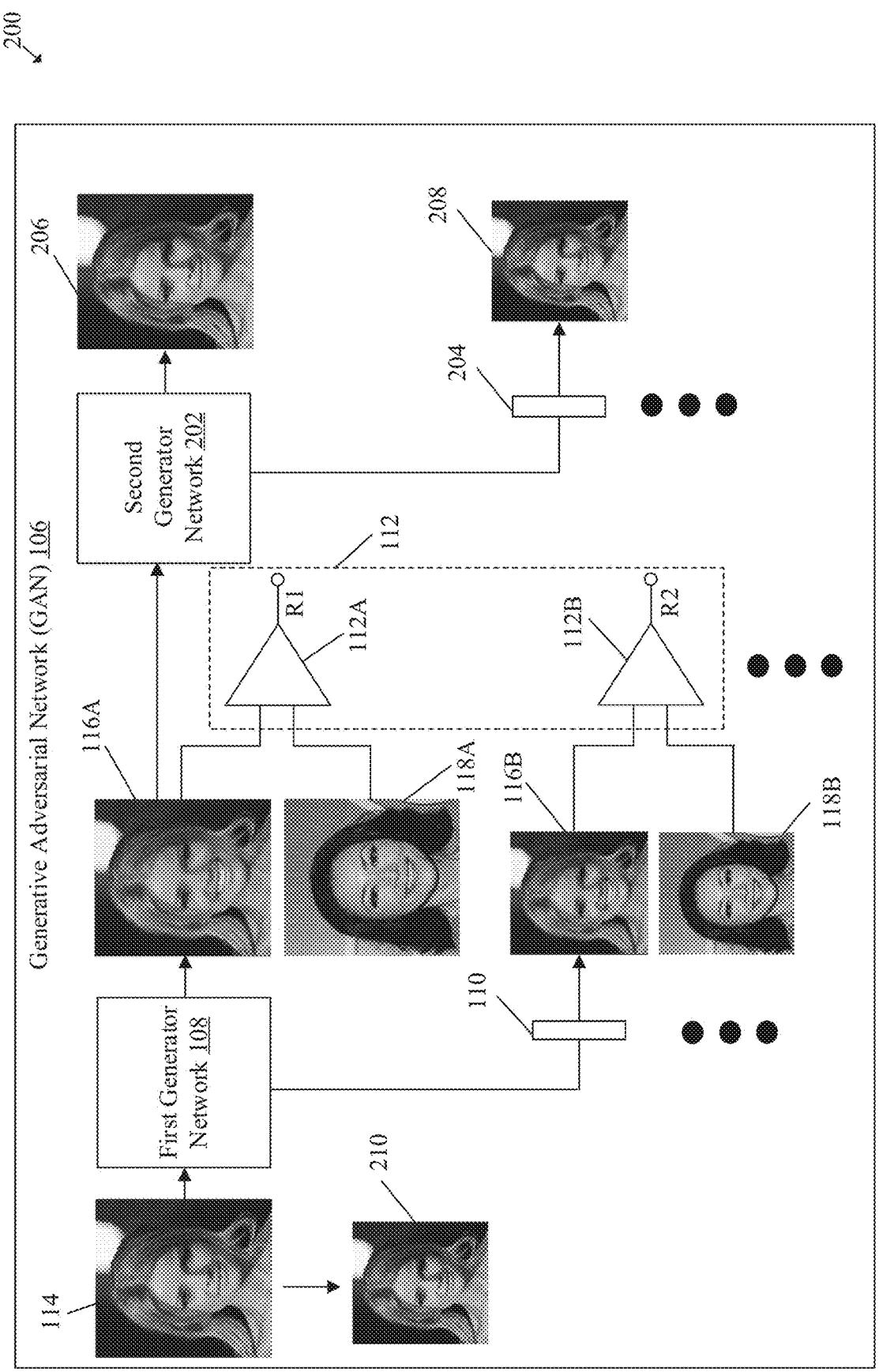
FIG. 2 is a diagram that illustrates an exemplary variant of a neural network of FIG. 1, in accordance with an embodiment of the disclosure.

FIG. 2 is a diagram that illustrates an exemplary variant of the neural network of FIG. 1, in accordance with an embodiment of the disclosure. FIG. 2 is explained in conjunction with elements from FIG. 1. With reference to FIG. 2, there is shown a diagram 200 of the GAN 106, which may be an exemplary variant of the GAN 106 of FIG. 1. The GAN 106 may include a second generator network 202 and a second feature-to-image generator 204 along with the first generator network 108, the first feature-to-image generator 110, and the first plurality of discriminator networks 112. The second generator network 202 may be coupled with the second feature-to-image generator 204. The first generator network 108, the second generator network 202, the first plurality of discriminator networks 112, feature-to-image generators (such as the first feature-to-image generator 110 and the second feature-to-image generator 204) may together form the GAN 106 in a cyclic configuration.

The second generator network 202 may be similar to the first generator network 108 in terms of neural network architecture and may be trained on the image-to-image translation task. In an embodiment, an input layer of the second generator network 202 may be coupled to an output layer of the first generator network 108. The first synthetic image 116A (generated by the first generator network 108) may be provided as a first input to the second generator network 202. In the cyclic configuration, while the first generator network 108 may translate an input image to a synthetic image (which may differ in appearance, style, or domain in comparison to the input image), the second generator network 202 may attempt to reconstruct the input image back from the synthetic image (generated by the first generator network 108).

The second generator network 202 may be configured to generate a third synthetic image 206 based on the first synthetic image 116A as input. The third synthetic image 206 may be of same spatial resolution as that of the first synthetic image 116A and may correspond to a reconstruction of the first image 114 back from the first synthetic image 116A. Both the first synthetic image 116A and the third synthetic image 206 may have the first spatial resolution, for example, 64 by 64 pixels. For instance, if the first image 114 includes a face of the first person with the first face expression (for example, a neutral face) and the first synthetic image 116A includes the same face with a smiling face expression, then the third synthetic image 206 may be an image of the same face with the first face expression (for example, a neutral face). In comparison to the face in the first image 114, the face in the third synthetic image 206 may be generated by pure computation so as to resemble the face and the first face expression in the first image 114.

When generating back the third synthetic image 206 (for example, a neutral face), low-resolution or down-sampled images (for example, of same neutral face) may be generated using feature-to-image generators (such as the second feature-to-image generator 204). In an embodiment, similar to the first feature-to-image generator 110, the second feature-to-image generator 204 may be configured to extract a second feature map from a second intermediate layer of the second generator network 202. The second feature-to-image generator 204 may be configured to generate a fourth synthetic image 208 with a second spatial resolution based on the extracted second feature map. The second spatial resolution of the fourth synthetic image 208 may be same as the spatial resolution of the second synthetic image 116B and less than the first spatial resolution of the first synthetic image 116A.

The processor 104 may retrieve the first image 114 and the generated third synthetic image 206. After retrieving, the processor 104 may be configured to determine a first reconstruction loss between the generated third synthetic image 206 and the first image 114. The first reconstruction loss between the generated third synthetic image 206 and the first image 114 may be measured, for example, as a mean of an absolute difference between the generated third synthetic image 206 and the first image 114.

In an embodiment, the processor 104 may be configured to process the first image 114 to generate a first down-sampled image 210 (which may have the second spatial resolution). The second spatial resolution of the generated first down-sampled image 210 may be less than the first spatial resolution of the first image 114 and may match the spatial resolution of the fourth synthetic image 208. The processor 104 may be configured to retrieve the first down-sampled image 210 and the generated fourth synthetic image 208. After retrieving, the processor 104 may be configured to determine a second reconstruction loss between the first down-sampled image 210 and the generated fourth synthetic image 208. In general, a reconstruction loss may correspond to a measure of how well an input image (i.e. the first image 114) is reconstructed by the GAN 106 in the cyclic configuration. For example, the reconstruction loss may be measured between multi-scale images (such as the first image 114 and down-sampled variants of the first image 114) of the neutral face and multi-scale synthetic images of the neutral face. Various types of distance, such as, but not limited to, a Euclidean distance, a Mahalanobis distance, or a cosine similarity may be used to determine the first reconstruction loss and/or the second reconstruction loss. The reconstruction losses (such as the first and second reconstruction losses) may be minimum when the first generator network 108 and the second discriminator network 112B generate plausible data as output.

The processor 104 may be configured to train the first generator network 108 based on the determined first reconstruction loss and the determined second reconstruction loss. These reconstruction losses (along the generator losses, as described in FIG. 1) improve the network performance and the convergence property as the first generator network 108 is trained. In training, the processor 104 may be configured to iteratively modify the set of parameters associated with the first generator network 108 so as to gradually minimize the determined first reconstruction loss and the determined second reconstruction loss. The modification may be done in an iterative manner, based on an optimization method that may be suitable for unsupervised learning of the first generator network 108.

Figure 3:
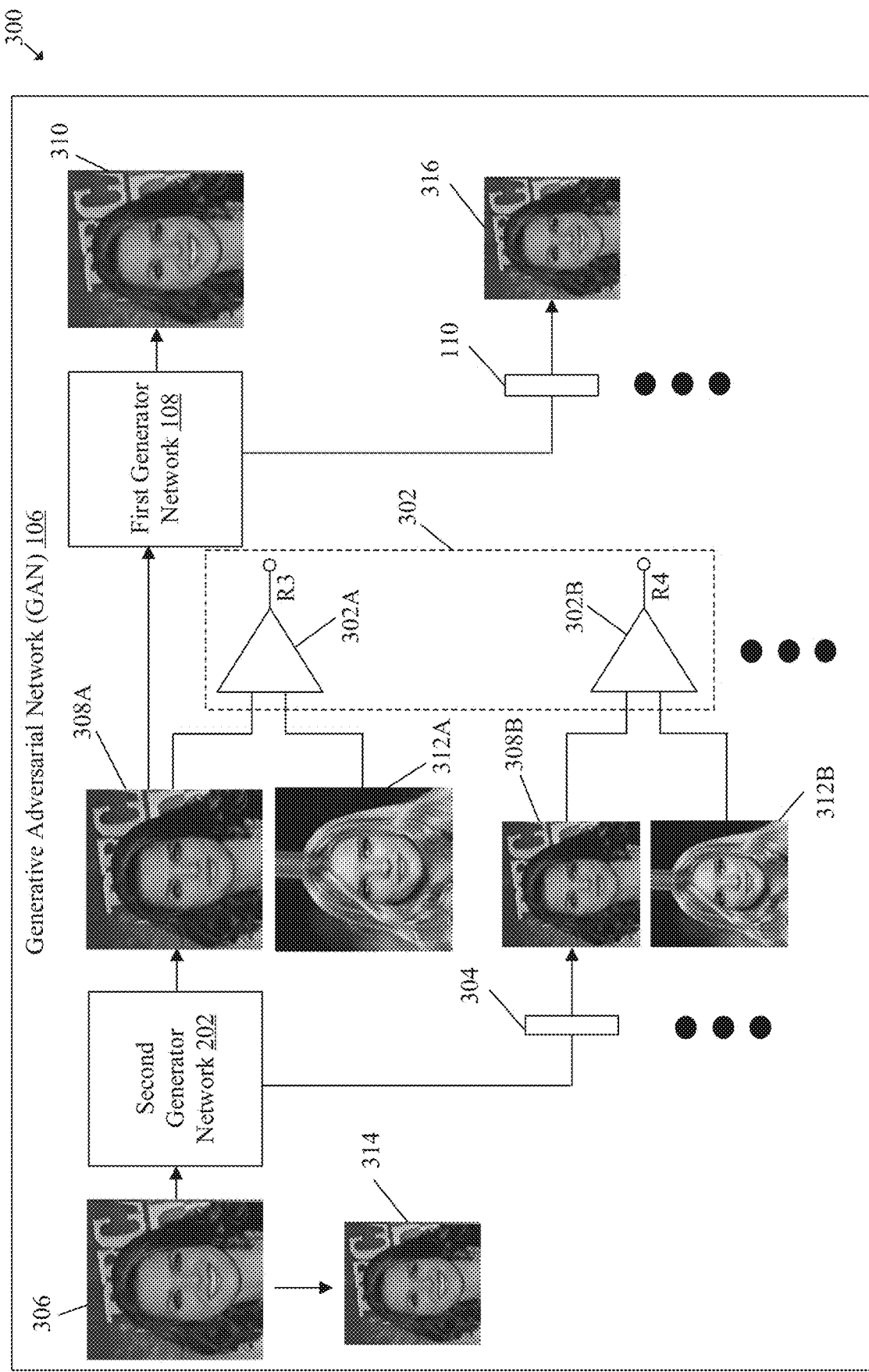
FIG. 3 is a diagram that illustrates an exemplary variant of a neural network of FIG. 1 or FIG. 2, in accordance with an embodiment of the disclosure.

FIG. 3 is a diagram that illustrates an exemplary variant of the neural network of FIG. 1 or FIG. 2, in accordance with an embodiment of the disclosure. FIG. 3 is explained in conjunction with elements from FIG. 1 and FIG. 2. With reference to FIG. 3, there is shown a diagram 300 of the GAN 106, which may be an exemplary variant of the GAN 106 of FIG. 1 or FIG. 2. The GAN 106 may include a second plurality of discriminator networks 302 and a third feature-to-image generator 304. The second plurality of discriminator networks 302 may include, for example, a third discriminator network 302A and a fourth discriminator network 302B. With reference to FIG. 3, there is further shown the first generator network 108, the second generator network 202, and the first feature-to-image generator 110.

The GAN 106 of FIG. 3 may be used to further improve the network performance during the training. For this, the order of the two networks (i.e. the first generator network 108 and the second generator network 202) is reversed during training. As shown, for example, an output layer of the second generator network 202 may be coupled to the input layer of the first generator network 108.

The second generator network 202 may be configured to receive a second image 306 as a second input. The second image 306 may be, for example, a real image of any animate or inanimate object that may be captured with an image capture device (such as a camera). By way of example, and not limitation, the second image 306 may be of the face of the first person with the second face expression (such as the smiling face expression).

The second generator network 202 may be configured to generate a fifth synthetic image 308A based on the received second image 306. The fifth synthetic image 308A may be of the first spatial resolution (same as that of the second image 306) and may be different from the second image 306 in at least one of appearance, style, or domain. By way of example, and not limitation, the fifth synthetic image 308A may be different from the second image 306 in appearance as the fifth synthetic image 308A may be of the face of the first person (or the second person) with the first face expression (such as the neutral face expression).

The first generator network 108 may be configured to receive the fifth synthetic image as input and may generate a sixth synthetic image 310 based on the fifth synthetic image 308A. The sixth synthetic image 310 may correspond to a reconstruction of the second image 306 from the fifth synthetic image 308A.

The GAN 106 may also include the third feature-to-image generator 304 that may be similar to the first feature-to-image generator 110 and may be configured to extract a third feature map from a third intermediate layer of the second generator network 202. After extracting the third feature map, the third feature-to-image generator 304 may be configured to generate a seventh synthetic image 308B based on the extracted third feature map. Also, the processor 104 may be configured to process the second image 306 to generate a second down-sampled image 314 of the face of the first person with the second face expression. The generated second down-sampled image 314 may be of the second spatial resolution (which is less than the first spatial resolution of the second image 306).

The third discriminator network 302A may be configured to generate a third result (R$_3$) that may be indicative of whether the fifth synthetic image 308A is real or fake in comparison to a third reference image 312A. Similarly, the fourth discriminator network 302B configured to generate a fourth result (R$_4$) that may be indicative of whether the seventh synthetic image 308B is real or fake in comparison to a fourth reference image 312B.

The processor 104 may receive the generated third result (R$_3$) and the generated fourth result (R$_2$) from the third discriminator network 302A and the fourth discriminator network 302B, respectively. Also, the processor 104 may determine second generator losses that may be associated with the received third result (R$_3$) and the received fourth result (R$_4$). Each of the second generator losses may be a quantitative measure of a deviation or a difference between a predicted output (for example, the fifth synthetic image 308A) and a reference or expected output (for example, the third reference image 312A). After the determination of the second generator losses, the processor 104 may be configured to train the second generator network 202 in the adversarial manner against the second plurality of discriminator networks 302 based on the determined second generator losses. Details about training are provided, for example in FIG. 1 and FIG. 2.

In an embodiment, the processor 104 may be configured to determine a third reconstruction loss between the generated third synthetic image 206 and the first image 114. The third reconstruction loss between the generated third synthetic image 206 and the first image 114 may be measured, for example, as a mean of the absolute difference between the generated third synthetic image 206 and the first image 114. The processor may be configured to train the second generator network 202 further based on the determined third reconstruction loss.

In an embodiment, the processor 104 may retrieve the second down-sampled image 314 and an eighth synthetic image 316. The eighth synthetic image 316 may be generated by the first feature-to-image generator 110 based on the fifth synthetic image 308A as input. Thereafter, the processor 104 may be configured to determine a fourth reconstruction loss between the second down-sampled image 314 and the generated eighth synthetic image 316. The fourth reconstruction loss between the second down-sampled image 314 and the generated eighth synthetic image 316 may be measured, for example, as a mean of an absolute difference between the second down-sampled image 314 and the generated eighth synthetic image 316. The processor 104 may be configured to train the second generator network 202 further based on the determined fourth reconstruction loss.

It should be noted that the second image 306 of the face of the person with a smiling face expression in FIG. 3 is presented merely as an example and should not be construed as limiting for the disclosure. The present disclosure may be also applicable to other types of images, such as a semantic mask, a cartoonish image, and a grayscale image. A description of other types of images has been omitted from the disclosure for the sake of brevity.

Figure 4:
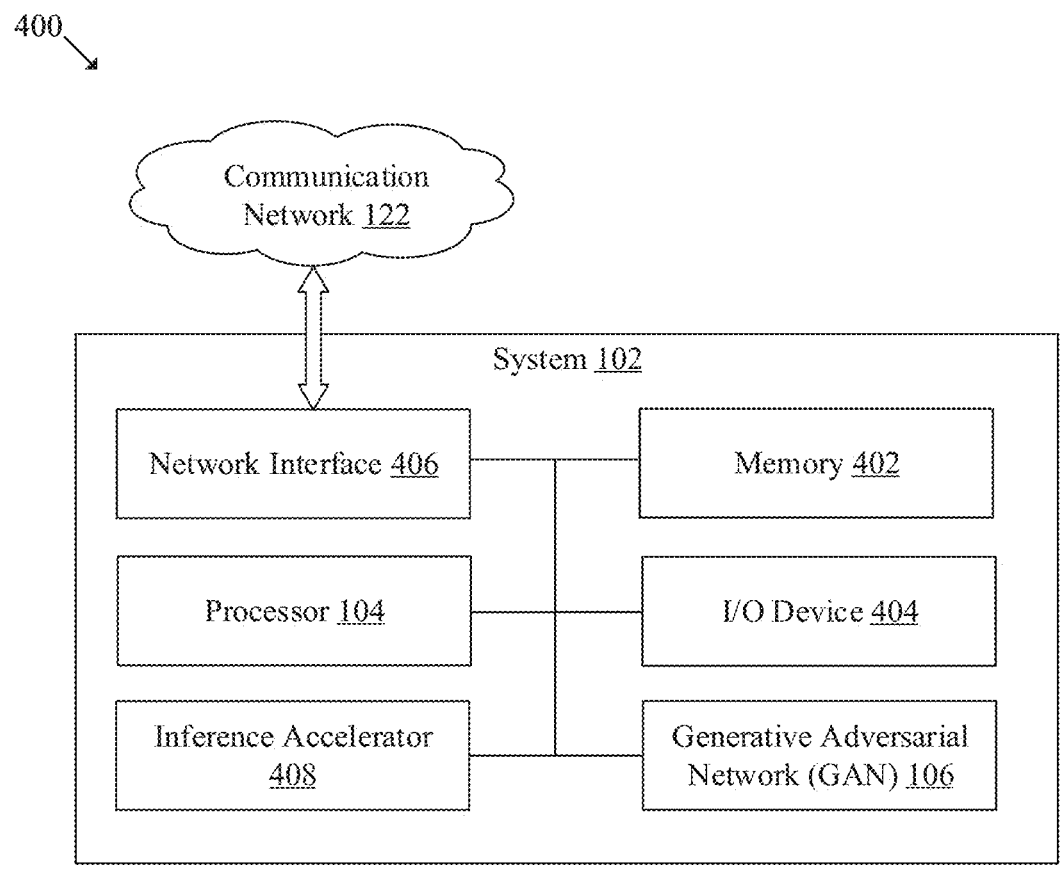
FIG. 4 is a block diagram of an exemplary system for neural network-based image-to-image translation, in accordance with an embodiment of the disclosure.

FIG. 4 is an exemplary block diagram of a system for neural network-based image-to-image translation, in accordance with an embodiment of the disclosure. FIG. 4 is explained in conjunction with elements from FIG. 1, FIG. 2, and FIG. 3. With reference to FIG. 4, there is shown a block diagram 400 of the system 102 of FIG. 1. The system includes memory 402, an input/output (I/O) device 404, a network interface 406, an inference accelerator 408, and the GAN 106.

The memory 402 may include suitable logic, circuitry, and/or interfaces that may be configured to store the program instructions executable by the processor 104. Additionally, the memory 402 may store the first image 114 and the second image 306. In at least one embodiment, the memory 402 may also store data, such as reference images and synthetic images for training of the GAN 106. Examples of implementation of the memory 402 may include, but are not limited to, Random Access Memory (RAM), Read Only Memory (ROM), Electrically Erasable Programmable Read- Only Memory (EEPROM), Hard Disk Drive (HDD), a Solid-State Drive (SSD), a CPU cache, and/or a Secure Digital (SD) card.

The I/O device 404 may include suitable logic, circuitry, and/or interfaces that may be configured to receive one or more user inputs and/or render information produced by the system 102. The I/O device 404 may include various input and output devices, which may be configured to communicate with different operational components of the system 102. Examples of the I/O device 404 may include, but are not limited to, a touch screen, a keyboard, a mouse, a joystick, a microphone, and a display screen.

The network interface 406 may include suitable logic, circuitry, interfaces, and/or code that may be configured to establish communication between the system 102, and the deployment device 120, via the communication network 122. The network interface 406 may be configured to implement known technologies to support wired or wireless communication. The network interface 406 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 406 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The inference accelerator 408 may include suitable logic, circuitry, interfaces, and/or code that may be configured to operate as a co-processor for the processor 104 to accelerate computations associated with the operations of the GAN 106. For instance, the inference accelerator 408 may accelerate the computations on the system 102 such that one or more synthetic images are generated in less time than what is typically incurred without the use of the inference accelerator 408. The inference accelerator 408 may implement various acceleration techniques, such as parallelization of some or all of the operations of the first generator network 108 and the second generator network 202. The inference accelerator 408 may be implemented as a software, a hardware, or a combination thereof. Example implementations of the inference accelerator 408 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

Figure 5:
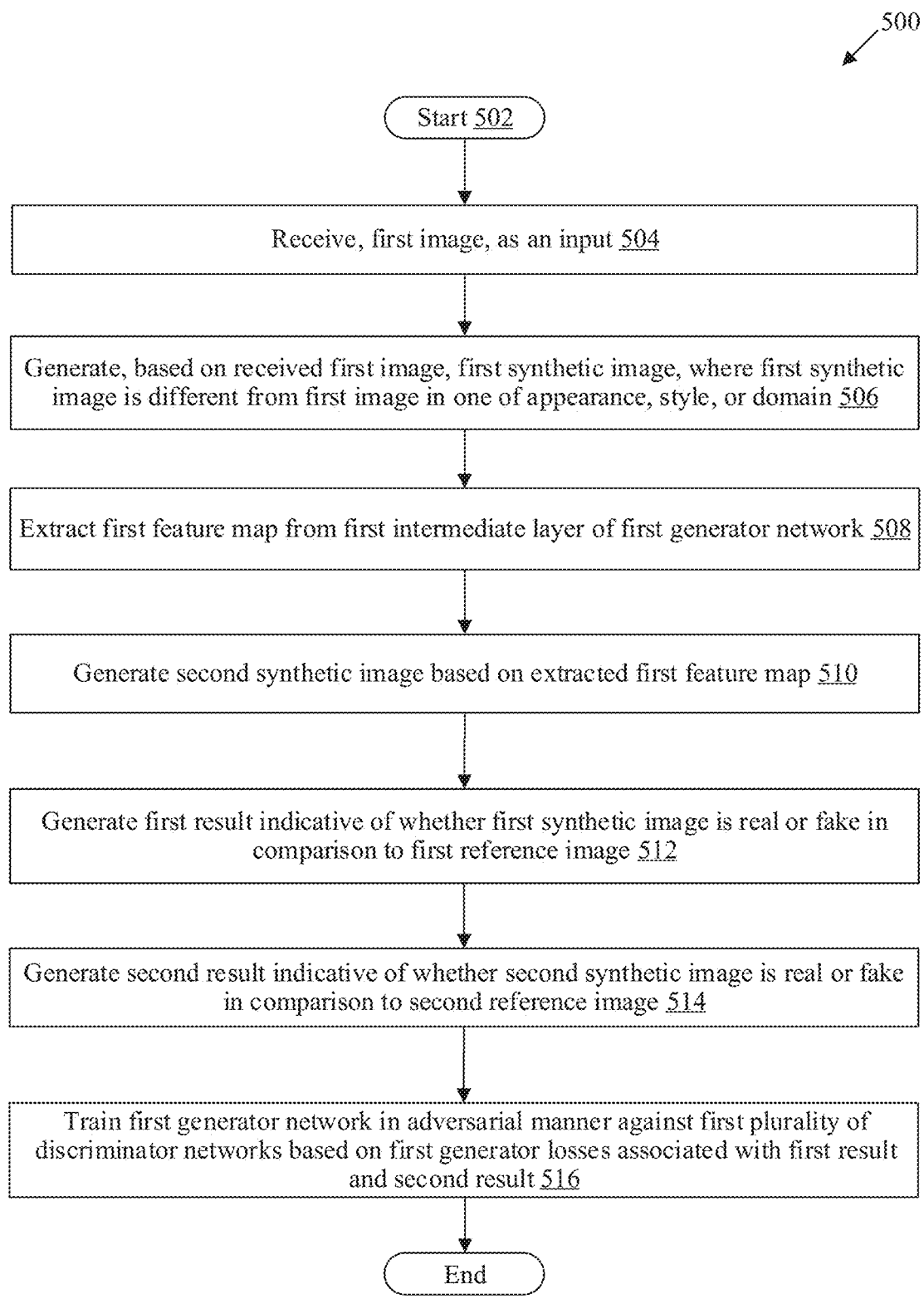
FIG. 5 is a flowchart that illustrates an exemplary method of neural network-based image-to-image translation, in accordance with an embodiment of the disclosure.

FIG. 5 is a flowchart that illustrates an exemplary method of neural network-based image-to-image translation, in accordance with an embodiment of the disclosure. FIG. 5 is explained in conjunction with elements from FIGS. 1, 2, 3, and 4. With reference to FIG. 5, there is shown a flowchart 500. The operations of the flowchart 500 may start at 502 and may proceed to 504.

At 504, the first image 114 may be received as an input. In at least one embodiment, the first generator network 108 may be configured to receive first image 114 as the input.

At 506, the first synthetic image 116A may be generated based on the received first image 114. The first synthetic image 116A may be different from the first image 114 in one of appearance, style, or domain. In at least one embodiment, the first generator network 108 may be configured to generate the first synthetic image 116A that may be different from the first image 114 in one of appearance, style, or domain.

At 508, the first feature map may be extracted from the first intermediate layer of the first generator network 108. In at least one embodiment, the first feature-to-image generator 110 may be configured to extract the first feature map from the first intermediate layer of the first generator network 108.

At 510, the second synthetic image 116B may be generated. The second synthetic image 116B may be generated based on the extracted first feature map. In at least one embodiment, the first feature-to-image generator 110 may be configured to generate the second synthetic image 116B based on the extracted first feature map.

At 512, the first result indicative of whether the first synthetic image 116A is real or fake in comparison to the first reference image 118A may be generated. In at least one embodiment, the first discriminator network 112A may be configured to generate the first result indicative of whether the first synthetic image 116A is real or fake in comparison to the first reference image 118A.

At 514, the second result indicative of whether the second synthetic image 116B is real or fake in comparison to the second reference image 118B may be generated. In at least one embodiment, the second discriminator network 112B may be configured to generate the second result indicative of whether the second synthetic image 116B is real or fake in comparison to the second reference image 118B.

At 516, the first generator network 108 may be trained. The first generator network 108 may be trained in the adversarial manner against the first plurality of discriminator networks 112 based on first generator losses associated with the first result and the second result. In at least one embodiment, the processor 104 may be configured to train the first generator network 108 in the adversarial manner against the first plurality of discriminator networks 112 based on the first generator losses associated with the first result and the second result. Control may pass to end.

Various embodiments of the disclosure may provide a non-transitory computer-readable medium and/or storage medium having stored thereon, instructions executable by a machine and/or a computer to operate a system (e.g., the system 102) for neural network-based image-to-image translation. The instructions may cause the machine and/or computer to perform operations that include receiving a first image (e.g., the first image 114) as an input. The operations further include generating a first synthetic image (e.g., the first synthetic image 116A) based on the received first image. The first synthetic image may be different from the first image in one of appearance, style, or domain. The operations further include extracting a first feature map from a first intermediate layer of a first generator network (e.g., the first generator network 108). The operations further include generating a second synthetic image 116B based on the extracted first feature map. The operations further include generating a first result indicative of whether the first synthetic image is real or fake in comparison to a first reference image (e.g., the first reference image 118A). The operations further include generating a second result indicative of whether the second synthetic image is real or fake in comparison to a second reference image (e.g., the second reference image 118B). The operations further include training the first generator network 108 in an adversarial manner against the first plurality of discriminator networks based on first generator losses associated with the first result and the second result.

Certain embodiments of the disclosure may be found in a system and a method for neural network-based image-to-image translation. Various embodiments of the disclosure may provide the system 102 that may include the processor 104 and the GAN 106. The GAN 106 may include the first generator network 108, the second generator network 202, the first feature-to-image generator 110, and the first plurality of discriminator networks 112. Each discriminator network of the first plurality of discriminator networks 112 may be a neural network and the first generator network 108, the second generator network 202, and the first plurality of discriminator networks 112 together form the GAN 106 in a cyclic configuration.

The first generator network 108 may be configured to receive the first image 114 as an input and generate the first synthetic image 116A based on the received first image 114. The first synthetic image 116A may be different from the first image 114 in one of appearance, style, or domain. The first feature-to-image generator 110 may be configured to extract the first feature map from the first intermediate layer of the first generator network 108 and generate the second synthetic image 116B based on the extracted first feature map. The first plurality of discriminator networks 112 may be coupled to the first generator network 108 and may include the first discriminator network 112A and the second discriminator network 112B. The first discriminator network 112A may be configured to generate the first result indicative of whether the first synthetic image 116A is real or fake in comparison to the first reference image 118A. The second discriminator network 112B may be configured to generate a second result indicative of whether the second synthetic image 116B is real or fake in comparison to the second reference image 118B. The processor 104 may be configured to train the first generator network 108 in an adversarial manner against the first plurality of discriminator networks 112 based on first generator losses associated with the first result and the second result.

In accordance with an embodiment, an input layer of the second generator network 202 may be coupled to an output layer of the first generator network 108. The second generator network 202 may be configured to generate a third synthetic image 206 based on the first synthetic image 116A as an input to the second generator network 202. The third synthetic image 206 may correspond to a reconstruction of the first image 114 from the first synthetic image 116A.

In accordance with an embodiment, the system 102 may be further configured to determine a first reconstruction loss between the generated third synthetic image 206 and the first image 114 and further train the first generator network 108 based on the determined first reconstruction loss.

In accordance with an embodiment, the system 102 further includes a second feature-to-image generator 204 that may be coupled to the second generator network 202. The second feature-to-image generator 204 may be configured to extract a second feature map from a second intermediate layer of the second generator network 202 and generate a fourth synthetic image 208 based on the extracted second feature map.

In accordance with an embodiment, the processor 104 may be configured to process the first image 114 to generate the first down-sampled image 210. The spatial resolution of the generated first down-sampled image 210 may be less than a spatial resolution of the first image 114. The processor 104 may be further configured to determine a second reconstruction loss between the generated first down-sampled image 210 and the generated fourth synthetic image 208. The processor 104 may be further configured to train the first generator network 108 further based on the determined second reconstruction loss.

In accordance with an embodiment, an output layer of the second generator network 202 may be coupled to an input layer of the first generator network 108. The second generator network 202 may be configured to generate the fifth synthetic image 308A based on a second image 306 as input to the second generator network 202. The fifth synthetic image 308A may be different from the second image 306 in appearance, style, or domain.

In accordance with an embodiment, the first generator network 108 may be configured to generate the sixth synthetic image 310 based on the fifth synthetic image 308A as input to the first generator network 108. The sixth synthetic image 310 may correspond to a reconstruction of the second image 306 from the fifth synthetic image 308A.

In accordance with an embodiment, the processor 104 may be configured to determine a third reconstruction loss between the generated third synthetic image 206 and the first image 114 and train the second generator network 202 based on the determined third reconstruction loss.

In accordance with an embodiment, the system 102 may further include the third feature-to-image generator 304 and the second plurality of discriminator networks 302 that may be coupled to the second generator network 202. The third feature-to-image generator 304 may be configured to extract a third feature map from a third intermediate layer of the second generator network 202 and generate a seventh synthetic image 308B based on the extracted third feature map. The third discriminator network 302A may be configured to generate a third result indicative of whether the fifth synthetic image 308A is real or fake in comparison to a third reference image 312A. The fourth discriminator network 302B may be configured to generate a fourth result indicative of whether the seventh synthetic image 308B is real or fake in comparison to the fourth reference image 312B. The processor 104 may be further configured to train the second generator network 202 in the adversarial manner against the first plurality of discriminator networks 112 based on second generator losses associated with the third result and the fourth result.

In accordance with an embodiment, the first generator network 108 may be trained on an image-to-image translation task. The image-to-image translation task may be one of an image-to-semantic mask generation task, a semantic mask-to-image generation task, a photo image-to-cartoonish image generation task, a cartoonish image-to-photo image generation task, a low-resolution image-to-high-resolution image generation task, a neutral face image-to-blend-shape image generation task, a grayscale image-to-color image generation task, an image inpainting task, or an image retouching task.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. A system, comprising:
a first generator network configured to:
  receive, a first image, as an input; and
  generate, based on the received first image, a first synthetic image, wherein the first synthetic image is different from the first image in one of appearance, style, or domain;
a first feature-to-image generator configured to:
  extract a first feature map from a first intermediate layer of the first generator network; and
  generate a second synthetic image based on the extracted first feature map;
a first plurality of discriminator networks coupled to the first generator network, wherein the first plurality of discriminator networks comprises:
  a first discriminator network configured to generate a first result indicative of whether the first synthetic image is real or fake in comparison to a first reference image; and
  a second discriminator network configured to generate a second result indicative of whether the second synthetic image is real or fake in comparison to a second reference image;
a processor configured to train the first generator network in an adversarial manner against the first plurality of discriminator networks based on first generator losses associated with the first result and the second result;
a second generator network, an output layer of which is coupled to an input layer of the first generator network, wherein the second generator network is configured to generate a third synthetic image based on a second image as input to the second generator network,
the third synthetic image is different from the second image in appearance, style, or domain,
the first generator network is configured to generate a fourth synthetic image based on the third synthetic image as input to the first generator network, and
the fourth synthetic image corresponds to a reconstruction of the second image from the third synthetic image; and
a second feature-to-image generator configured to:
  extract a second feature map from a second intermediate layer of the second generator network; and
  generate a fifth synthetic image based on the extracted second feature map.

2. The system according to claim 1, wherein
each discriminator network of the first plurality of discriminator networks is a neural network, and
the first generator network, the second generator network, and the first plurality of discriminator networks together form a Generative Adversarial Network (GAN) in a cyclic configuration.

3. The system according to claim 1, wherein the processor is further configured to:
determine a reconstruction loss between the generated fourth synthetic image and the second image; and
train the first generator network based on the determined third reconstruction loss.

4. The system according to claim 1, further comprising a second plurality of discriminator networks coupled to the second generator network, wherein the second plurality of discriminator networks comprises:
a third discriminator network configured to generate a third result indicative of whether the third synthetic image is real or fake in comparison to a third reference image; and
a fourth discriminator network configured to generate a fourth result indicative of whether the fifth synthetic image is real or fake in comparison to a fourth reference image.

5. The system according to claim 4, wherein the processor is further configured to train the second generator network in the adversarial manner against the first plurality of discriminator networks based on second generator losses associated with the third result and the fourth result.

6. The system according to claim 1, wherein the first generator network is trained on an image-to-image translation task, which is one of an image-to-semantic mask generation task, a semantic mask-to-image generation task, a photo image-to-cartoonish image generation task, a cartoonish image-to-photo image generation task, a low-resolution image-to-high-resolution image generation task, a neutral face image-to-blend-shape image generation task, a grayscale image-to-color image generation task, an image inpainting task, or an image retouching task.

7. A system, comprising:
a first generator network configured to:
  receive, a first image, as an input; and
  generate, based on the received first image, a first synthetic image, wherein the first synthetic image is different from the first image in one of appearance, style, or domain;
a first feature-to-image generator configured to:
  extract a first feature map from a first intermediate layer of the first generator network; and generate a second synthetic image based on the extracted first feature map;
a first plurality of discriminator networks coupled to the first generator network, wherein the first plurality of discriminator networks comprises:
a first discriminator network configured to generate a first result indicative of whether the first synthetic image is real or fake in comparison to a first reference image; and
a second discriminator network configured to generate a second result indicative of whether the second synthetic image is real or fake in comparison to a second reference image;
a processor configured to train the first generator network in an adversarial manner against the first plurality of discriminator networks based on first generator losses associated with the first result and the second result;
a second generator network, an input layer of which is coupled to an output layer of the first generator network, wherein
the second generator network is configured to generate a third synthetic image based on the first synthetic image as input to the second generator network, and
the third synthetic image corresponds to a reconstruction of the first image from the first synthetic image; and
a second feature-to-image generator which is coupled to the second generator network, wherein the second feature-to-image generator is configured to:
extract a second feature map from a second intermediate layer of the second generator network; and
generate a fourth synthetic image based on the extracted second feature map.

8. The system according to claim 7, wherein the processor is further configured to:
process the first image to generate a down-sampled image, a spatial resolution of which is less than a spatial resolution of the first image; and
determine a reconstruction loss between the generated down-sampled image and the generated fourth synthetic image.

9. The system according to claim 8, wherein the processor is further configured to train the first generator network based on the determined reconstruction loss.

10. A method, comprising:
receiving, by a first generator network, a first image as an input;
generating, by a first generator network, a first synthetic image based on the received first image, wherein the first synthetic image is different from the first image in one of appearance, style, or domain;
extracting, by a first feature-to-image generator, a first feature map from a first intermediate layer of the first generator network;
generating, by the first feature-to-image generator, a second synthetic image based on the extracted first feature map;
generating, by a first discriminator network of a first plurality of discriminator networks coupled to the first generator network, a first result indicative of whether the first synthetic image is real or fake in comparison to a first reference image;
generating, by a second discriminator network of the first plurality of discriminator networks, a second result indicative of whether the second synthetic image is real or fake in comparison to a second reference image; and
training the first generator network in an adversarial manner against the first plurality of discriminator networks based on first generator losses associated with the first result and the second result;
generating, by a second generator network, a third synthetic image based on the first synthetic image as input to the second generator network, wherein
an input layer of the second generator network is coupled to an output layer of the first generator network, and
the third synthetic image corresponds to a reconstruction of the first image from the first synthetic image;
extracting, by a second feature-to-image generator which is coupled to the second generator network, a second feature map from a second intermediate layer of the second generator network; and
generating, by the second feature-to-image generator, a fourth synthetic image based on the extracted second feature map.

11. The method according to claim 10, further comprising:
determining a first reconstruction loss between the generated third synthetic image and the first image; and
training the first generator network further based on the determined first reconstruction loss.

12. The method according to claim 10, wherein
each discriminator network of the first plurality of discriminator networks is a neural network, and
the first generator network, the second generator network, and the first plurality of discriminator networks together form a Generative Adversarial Network (GAN) in a cyclic configuration.

13. The method according to claim 10, further comprising:
processing the first image to generate a down-sampled image, a spatial resolution of which is less than a spatial resolution of the first image;
determining a second reconstruction loss between the generated down-sampled image and the generated fourth synthetic image; and
training the first generator network further based on the determined second reconstruction loss.

* * * * *